May 18, 1937.   E. H. ZICKLER   2,080,592
DRY COOKER
Filed Nov. 4, 1936
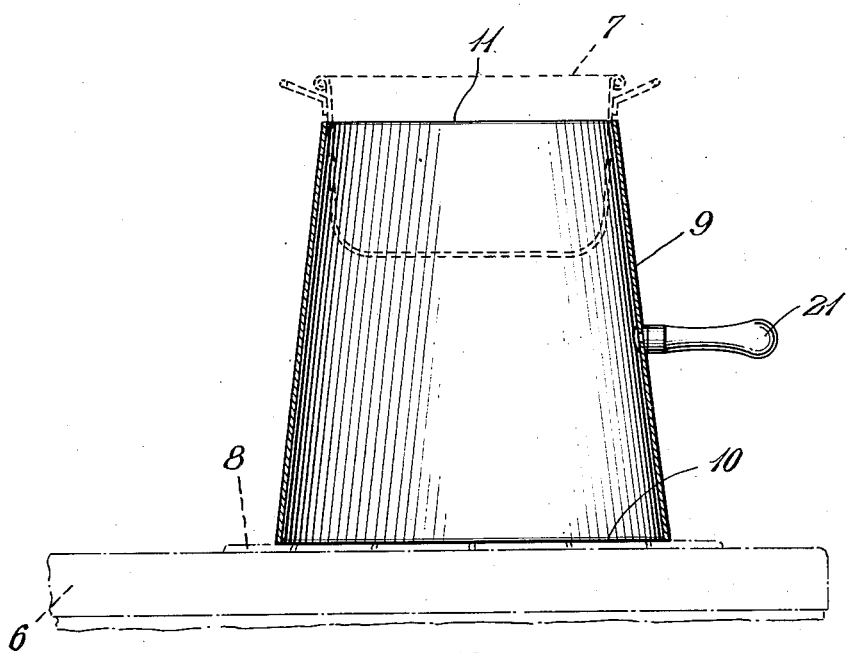
Fig. 1.
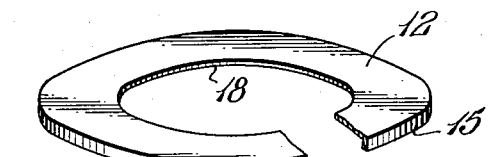
Fig. 3.
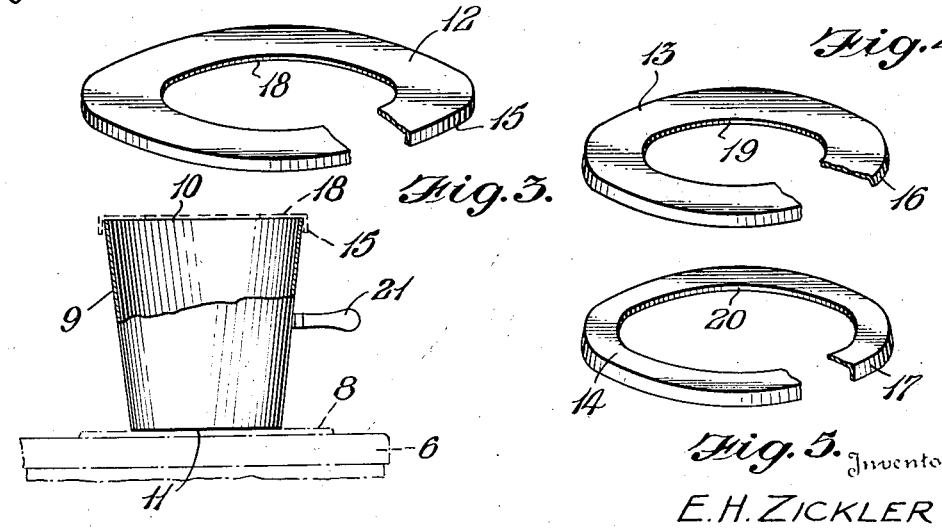
Fig. 2.
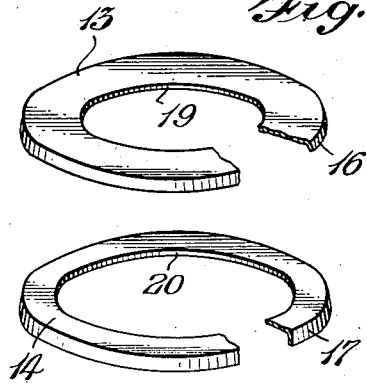
Fig. 4.
Fig. 5.
Inventor
E. H. ZICKLER,
By Wilkinson & Mawhinney
Attorneys Patented May 18, 1937

2,080,592

UNITED STATES PATENT OFFICE 2,080,592

DRY COOKER

Edward H. Zickler, Zillah, Wash.

Application November 4, 1936, Serial No. 109,158

2 Claims. (Cl. 53—8)

The present invention relates to improvements in dry cookers and has for an object to provide an improved cooking device that will do away with a necessity for having what are known as double boilers in which water is contained in a lower vessel, the heat, vapors and steam rising from which heats and cooks the food-stuffs in an upper container.

With such double boilers or wet cookers the process of cooking is slow in that the water must be first raised to a heating and cooking temperature before it begins to have any effect upon the contents of the upper vessel.

One purpose of the present invention is to avoid this delay, do away with the necessity of heating water and to provide a device which will subject the cooking utensil in which the food-stuff is contained directly to the action of the flames from the burner of the stove which is much more satisfactory and direct than going through the intermediary process of heating water and then having the water cook the food-stuff.

The improved dry cooker according to the present invention takes the place of the lower part of the ordinary double boiler. The improved device requires only one fire and thereby saves labor, time and money, besides avoiding the attention required in cooking with the double boiler to avoid the burning out of the bottom of the lower boiler when dry.

With the foregoing and other objects in view, the invention will be more fully described hereinafter, and will be more particularly pointed out in the claims appended hereto.

In the drawing, wherein like symbols refer to like or corresponding parts throughout the several views.

Figure 1 is a vertical section taken through an improved dry cooker constructed in accordance with the present invention and shown in place on a stove indicated in dotted lines with a cooking vessel, also indicated in dotted lines.

Figure 2 is a side elevation, with parts broken away and parts shown in section, of the improved dry cooker placed in an inverted position on a stove indicated in dotted lines and having one of the rings, also indicated in dotted lines, placed on the top thereof.

Figures 3, 4 and 5 show perspective views, with parts broken away and parts shown in section, of various types, sizes and styles of rings for use in connection with the dry cooker.

Referring more particularly to the drawing, a stove is indicated in dotted lines by the numeral 6 and a cooking pot or vessel is represented in dotted lines at 7. On the burner 8 of the stove there is shown in Figures 1 and 2 a dry cooker constructed according to the present invention and which consists of a frusto conical shell or tube 9 made from sheet metal or other appropriate material of suitable gauge. This shell or tube is entirely hollow within and it is open at both ends so that it forms a tubular body having an uninterrupted interior space open from end to end. The lower end is indicated at 10 and the upper end at 11. Both of these ends are completely open and entirely uninterrupted. Likewise the entire cross-sectional space confined within the shell 9 is entirely clear and uninterrupted from end to end whereby the direct heat from the burner 8 of the stove may ascend to the bottom and sides of the cooking vessel 7 for the purpose of cooking the food therein by the direct action of the fire from such stove without any intermediate medium of water interposed therebetween. This direct heat from the burner 8 is confined by the side walls of the shell 9 and focused upon the bottom and sides of the receptacle 7. In this way all the advantages of placing the pot 7 directly upon the burner 8 are secured, but at the same time the bottom of the vessel 7 is held aloft or remote from the burner 8 whereby the disadvantages of accidental burning of the food-stuff within the container 7 are avoided. In other words all of the heat from the burner 8 is substantially conserved by the tubular shell 9 from the time it is energized or created at the burner until it reaches the receptacle 7, but at the same time such receptacle is not subjected to the contact of the flame of the burner which burns out and destroys the bottoms of pots, kettles and other kitchen utensils and lessens the life thereof while at the same time having the tendency to scorch and burn food-stuff therein. With the improved device the scorching or burning of food-stuffs is avoided, the container is saved from burning and its life considerably extended. Moreover the food-stuff is more thoroughly and uniformly cooked and it is for this reason a better edible product.

The conical formation of the shell 9 causes the heat ascending from the larger end 10 to the smaller end 11 to converge and be concentrated upon the vessel 7. However, when the dry cooker is reversed in position from that shown in Figure 1 to that position shown in Figure 2 then the heat is constrained to diverge or scatter as it rises from the burner 8. In this way the heat may be either concentrated upon the vessel, or, by reversing the dry cooker, caused to disburse or scatter. The two differential ends 10 and 11 of the dry cooker also enable pots of different sizes or diameter to be accommodated in the device. However, for the wider end 10, or for both ends, rings, such as shown in Figures 3, 4 and 5, may be used in order to accommodate pots of any desired size so that, particularly where the scattering of the heat is desired as in the case of Figure 2, small pots may still be used in the large end 10 of the device by substituting one of the rings 12, 13 or 14. These rings will preferably have flanges 15, 16 and 17 depending from their outer edges, the rings being substantially circular and the diameter of the flanges being sufficient to fit snugly over the outside wall of the shell 9 at the larger opening 10. Thus the flange will center the ring and maintain the ring against radial shifting or against accidental displacement. In the rings are openings 18, 19 and 20 of various sizes to admit pots or vessels of various diameters. Otherwise stated the rings 12, 13 and 14 may be of different radial widths.

A handle 21 may be affixed to the shell 9 at an intermediate point to enable the dry cooker to be placed upon, and removed from, a stove or to be changed from an upright or an inverted position in an easy and quick manner.

The device may be placed on the lid of a coal or wood range, or upon an electric or gas stove. The device requires only one fire and directly heats the foot-stuff. Moreover the utensil being held remote from the flame does not require the constant attention of the housewife. The improved dry cooker is exceedingly economical in its construction and also in its service and its simplicity enables its use to be readily understood by the housewife.

It is obvious that various changes and modifications may be made in the details of construction and design of the above specifically described embodiment of this invention without departing from the spirit thereof, such changes and modifications being restricted only by the scope of the following claims.

What is claimed is:

1. An approved dry cooker comprising a frusto-conical shell of fire-resisting material open at both ends and unobstructed as to its interior from one open end to the other, one open end being greater in diameter than the other open end due to the conic section on which said shell is formed, the diameters of both small and large open ends of the shell being sufficiently great to enable either circumferential edge of the shell at the large or the small opening to seat upon the grill of the burner of a stove, rings having the same external diameter to enable all such rings to seat upon the circumferential edge of the shell at the larger opening, said rings having vertically downturned flanges fitting over a portion of the wall of the shell to avoid horizontal shifting of the rings on the shell, said rings having openings thereof of differential diameters, and a cooking vessel adapted to be seated in and supported in the opening in one of said rings or in the smaller open end of said shell.

2. An improved dry cooker of the character described comprising a shell of relatively thin-gage metal struck on a conic section and being entirely hollow within and having open ends of differential diameters, the diameters of both such open ends being sufficiently great to enable either circumferential edge of the shell about the large or small opening to seat upon the grill of the burner of a stove, a cooking vessel adapted to seat within the smaller open end of the shell and to rest upon the circumferential edge of that smaller opening, a ring having an outer circumference in excess of the diameter of the larger open end of the shell to enable such ring to be horizontally supported upon such outer circumferential edge of the larger shell opening, said ring having on its outer edge an annular flange turned down vertically from the plane of the ring to encompass a portion of the wall of the shell adjacent the larger opening whereby to avoid horizontal shifting of the ring upon the shell, said ring having an opening therein of sufficient diameter to receive and support said cooking vessel, and a handle secured to the shell approximately midway of the height thereof and projecting substantially horizontally outward from the shell wall to enable the manual lifting and rotating of the shell through 180° in either direction whereby to place the shell in either relatively inverted position upon the burner with the smaller or larger opening upper most.

EDWARD H. ZICKLER.